Patented July 2, 1929.

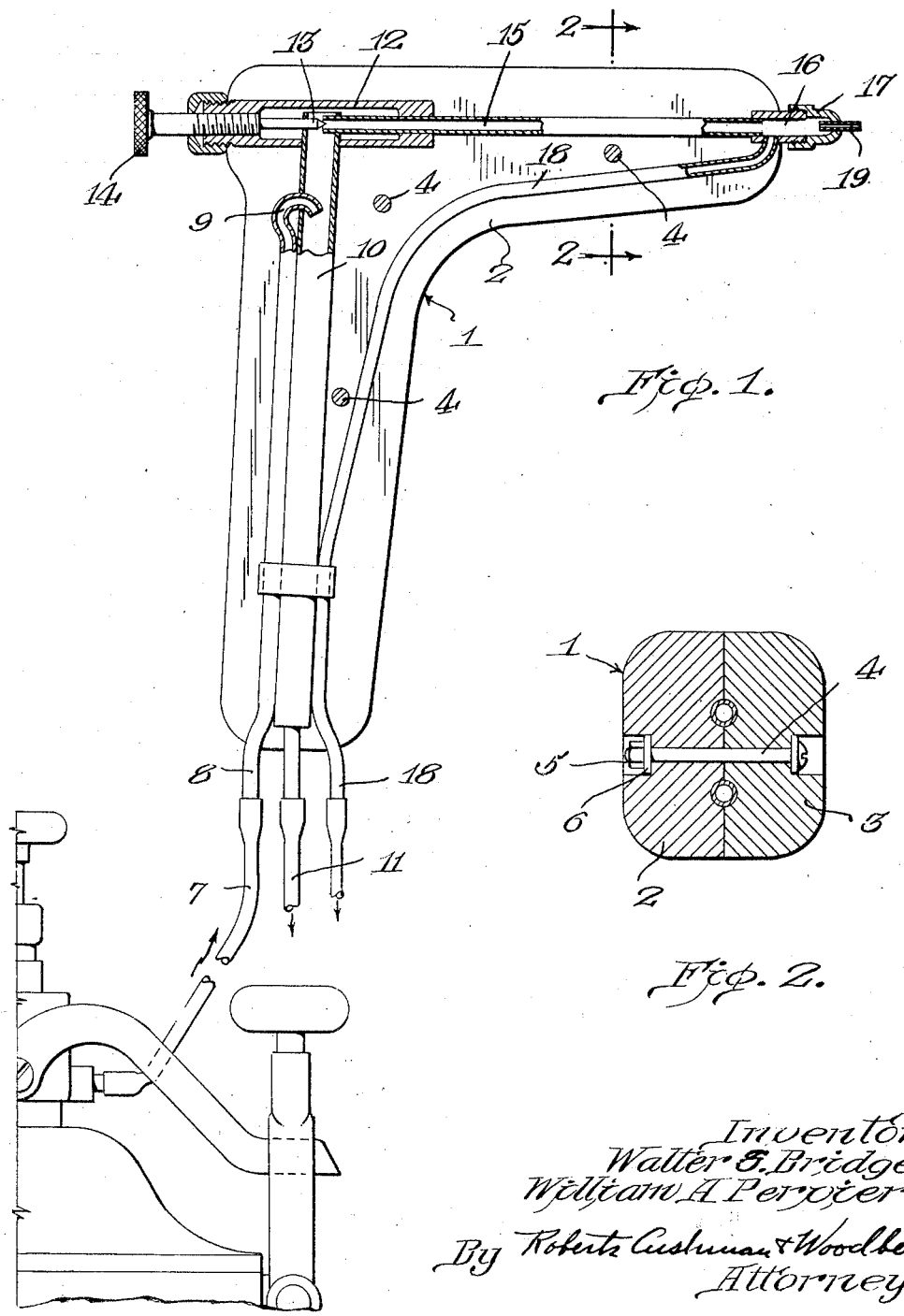

1,719,750

UNITED STATES PATENT OFFICE.

WALTER G. BRIDGE, OF NEWTON, AND WILLIAM A. PERVIER, OF WATERTOWN, MASSACHUSETTS, ASSIGNORS TO CHARLES E. PARKHURST, OF SOMERVILLE, MASSACHUSETTS.

DENTAL APPARATUS.

Application filed September 29, 1927. Serial No. 222,789.

This invention relates to a method of desensitizing the nerves of teeth and an apparatus designed to carry out the method. The apparatus comprises a type of nozzle adapted to produce a fine jet of steam which may conveniently be used by dentists in operating on or extracting teeth and to a type of steam generator suitable for use therewith.

Among the objects of the invention are to provide an efficient method of de-sensitizing the nerves of teeth to enable them to be operated on or extracted in a substantially painless manner; to provide a method which is quick, efficient and cheap; and to avoid the use of drugs of any kind, some of which have an undesirable physiological action; also to provide an apparatus capable of carrying out the method.

With respect to the apparatus the invention includes the provision of an improved nozzle which will operate to produce a very fine jet of steam and in so doing will provide means for separating from the steam any droplets of condensed water which might scald or burn the mouth or lips of a patient being operated upon; and also the provision of a steam generator which will be suited for use with a device of this character, which has provision for accurately controlling the amount and quality of the steam generated, and which is suitable for use in a dentist's operating room.

Other objects and advantages of the method and apparatus constituting the invention will be apparent from a reading of the following specification and appended claims when taken in connection with the accompanying drawings, in which:

Fig. 1 is a view partly in section of the nozzle and a portion of the steam generator with one-half of the handle or casing member of the nozzle removed;

Fig. 2 is a section substantially on the line 2—2 in Fig. 1.

We have found that if a tooth is heated to a temperature substantially above that of the body and yet considerably less than the boiling point of water, the nerve or nerves thereof are desensitized and small operations may be made on the tooth and in some cases it may be extracted, the preferred temperature being approximately 120° F. The most desirable and efficient way of producing such local heating we have found to be that of directing a jet of steam at a low pressure onto the tooth in question, it being necessary in some cases to protect the lips and gums of the patient during the treatment.

The apparatus which we have designed to carry out our method comprises briefly a steam generator having substantially automatic means for controlling it to generate low pressure steam and a hand nozzle which is provided with means for draining off any condensate which may accumulate in the passages to or in the nozzle or which may be carried mechanically by the flow of steam from the generator.

Referring to Figs. 1 and 2, the nozzle is indicated generally at 1 and comprises a pair of complementary halves 2 and 3 of heat insulating material such as cork forming a handle grip, the halves being fastened together in any suitable manner, as for example by a plurality of headed bolts 4 extending through registering openings in the halves and fastened in place by nuts 5 and washers 6. Steam may be conducted to the nozzle 1 through a flexible tube 7 connecting at the lower end of the handle grip to a tube 8 preferably of metal or other relatively hard material. The upper end of the tube 8 is curved as shown at 9, and directed downwardly into a well 10 extending substantially the entire length of the handle portion of the nozzle, the well having a suitable drain conduit 11 at its bottom. The well is connected at its upper end with a valve housing 12 in which is contained a needle valve 13 operated by the hand screw 14 and controlling the flow of steam from the well 10 into a substantially horizontal duct 15. Thus it will be seen that any steam which condenses in the ducts 7 and 8 from the generator or in the well 10 will be drained off through the duct 11.

At its forward end the duct 15 communicates with an enlarged chamber 16 having thick walls as seen at 17 which again serves as a condensing chamber and permits any steam which has condensed within the nozzle 1 to drain off through a duct 18. The drains 11 and 18 may communicate with the steam generator below the liquid level therein or with any suitable drain as desired. The chamber 16 is provided with a constricted outlet 19 through which the steam may flow and be directed toward the tooth to be operated upon.

From the above description, the operation of the steam generator and heating unit will be obvious. Power is supplied to the heating unit 47 through the lines 59, the heat being controlled by the rheostat 60. In the event that the water chamber 22 is dry when the power is turned on, the heat from the unit 47 will be conducted through the various parts to the thermostatic disk 57 which will flex suddenly and abruptly in the opposite direction and will open the circuit permitting the heating unit to cool off. After the thermostatic disk has cooled to a predetermined safe temperature, the disk 57 will snap abruptly back to the position shown in Fig. 4, again completing the circuit and thus preventing the burning out of the device.

Inasmuch as various changes may be made in our method and in the apparatus which we show and describe herein for carrying it out, we do not wish to be limited except by the scope of the appended claims.

We claim:

1. A steam nozzle for producing a fine jet of steam comprising a steam supply tube, a fine orifice at one end thereof, and a condensate drain from the tube adjacent to said orifice.

2. A steam nozzle for producing a fine jet of steam comprising a steam supply tube, a needle valve in said tube for controlling the flow of steam therethrough, an orifice, and means adjacent to the orifice for draining off any liquid which may condense in the nozzle or in the passages leading thereto.

3. A steam nozzle for producing a fine jet of steam comprising means for feeding steam to said nozzle, a needle valve in the nozzle, a duct from said needle valve, an orifice in the end of said duct, means for draining condensate from passage going to the needle valve, and means for draining condensate from said nozzle at a point adjacent to said orifice.

4. A steam nozzle for producing a fine jet of steam comprising a well, a downwardly directed duct for supplying steam to said well, a condensate drain at the bottom of said well, a dry steam outlet from the top of said well having a needle valve therein, a duct leading from said needle valve, a fine orifice at the end of said last-named duct, and a second condensate drain adjacent to said orifice.

5. A steam nozzle for producing a fine jet of steam comprising a steam supply tube, a thick walled enlarged expansion and cooling chamber at one end of said tube, a fine orifice in said chamber, and means for draining condensate from said chamber.

6. A steam nozzle for producing a fine jet of steam comprising a well, a steam supply to said well, a condensate drain from said well, a steam outlet tube from said well, a valve for regulating the flow of steam through the device, an enlargement in said outlet tube forming a cooling and expansion chamber at its outlet and having a fine orifice therein, and means for draining the condensate from said chamber.

7. A device for desensitizing the nerves of teeth comprising a steam nozzle, means for feeding steam thereto, means for controlling the flow of steam passing through the nozzle, a duct through the nozzle having a fine orifice at one end thereof, means adjacent to said orifice for draining off condensate, and a heat insulated handle substantially enclosing the nozzle parts.

8. In a device for desensitizing the nerves of teeth, a steam nozzle member, and means for supplying steam to said member, said nozzle member comprising an L-shaped handle of heat insulating material, a well in one arm of the handle, means for feeding steam downwardly into the well from a point adjacent to its top, a condensate drain duct connected to the bottom of the well, a duct in the other arm of the handle, a needle valve between said well and said last-named duct, an enlarged thick-walled member located at the end of said last-named duct outside the handle member and having an enlarged chamber therein, a fine outlet orifice from said chamber, and a duct for draining the condensate from said chamber, whereby to produce a fine jet of steam for treating the tooth.

Signed by us at Boston, Massachusetts, this 20th and 13th days of September, 1927, respectively.

WALTER G. BRIDGE.
WILLIAM A. PERVIER.